United States Patent

Sawyer

[15] 3,657,759
[45] Apr. 25, 1972

[54] SURFACE CONDITIONER
[72] Inventor: Harold T. Sawyer, Pacific Palisades, Calif.
[73] Assignee: Vernon D. Beehler, Los Angeles, Calif. a part interest
[22] Filed: Apr. 9, 1970
[21] Appl. No.: 26,885

Related U.S. Application Data

[63] Continuation-in-part of Ser. No. 832,156, June 11, 1969, which is a continuation-in-part of Ser. No. 832,180, June 11, 1969, which is a continuation-in-part of Ser. No. 631,736, Apr. 18, 1967, Pat. No. 3,507,695.

[52] U.S. Cl. ................................................... 15/98
[51] Int. Cl. .................................. A47l 11/03, A47l 11/06
[58] Field of Search ............................. 15/4–98; 51/174, 51/175

[56] References Cited

UNITED STATES PATENTS 3,497,898  3/1970  Sawyer ........................................ 15/98

Primary Examiner—Leon G. Machlin
Attorney—Beehler & Arant

[57] ABSTRACT

A machine capable of performing one or another of a variety of conditioning operations on a surface by use of vibration energy. A vertically extending base holding plate has a cantilever beam extending from it, with a captive stationary end fastened by a resilient mount to the plate. A source of vibration energy is mounted on the cantilever beam intermediate to its ends. A main resonant plate substantially parallel to the cantilever beam has a work shoe removably attached to it through a resilient pad. The end of said cantilever beam remote from the base holding plate has a second resonant plate secured to it in a position substantially parallel to the cantilever beam and the main resonant plate through a plurality of spaced resilient mounts, the combined structure of all the parts being such that they can be vibrated at or near their natural frequency by the chosen source of vibration energy.

13 Claims, 14 Drawing Figures

Patented April 25, 1972 3,657,759
3 Sheets-Sheet 1
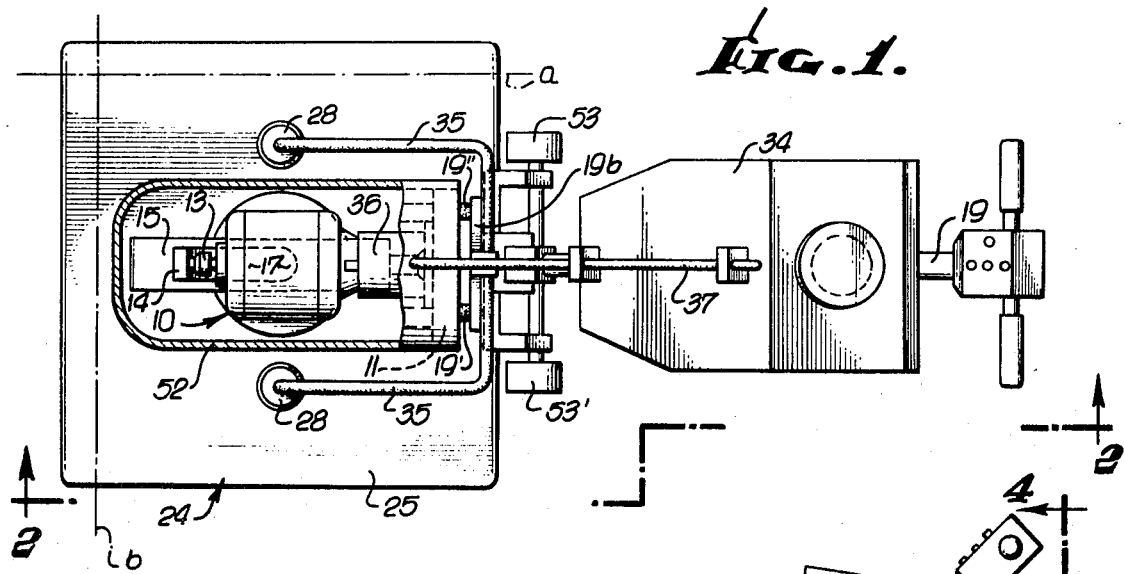
FIG. 1.
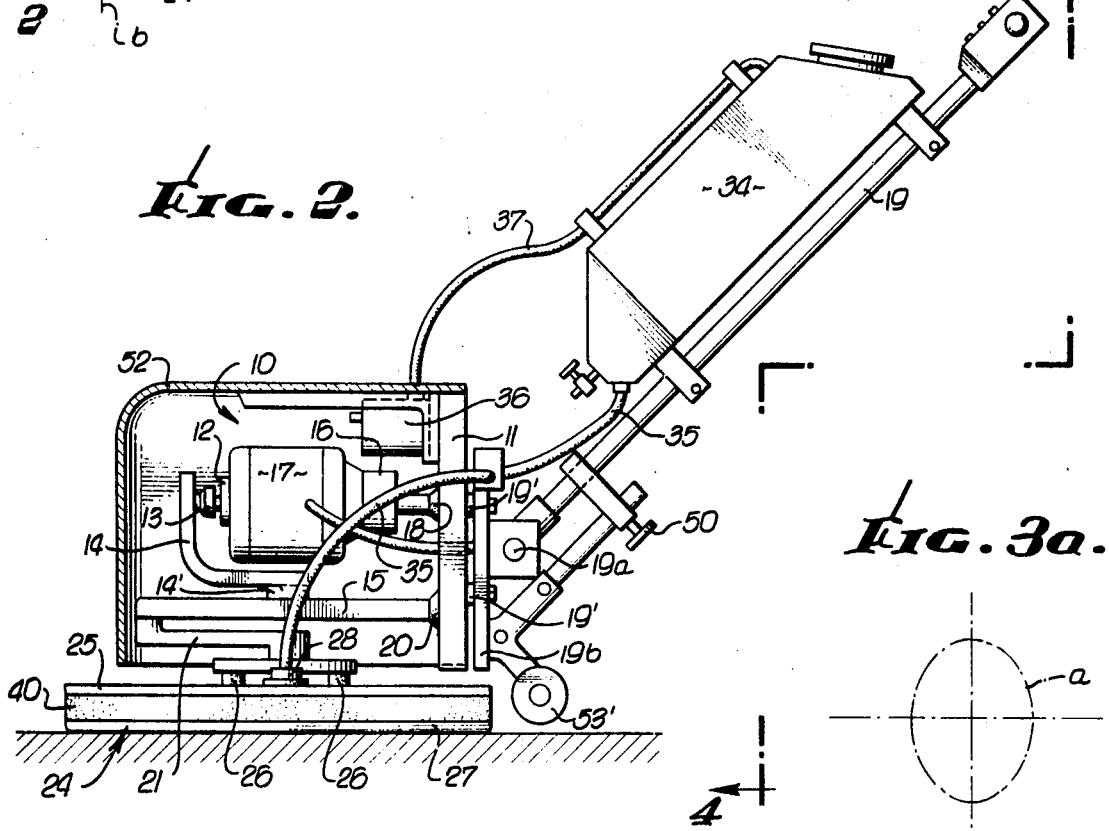
FIG. 2.
FIG. 3a.
FIG. 3b.
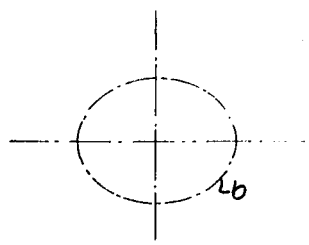
INVENTOR.
HAROLD T. SAWYER
By
Beehler & Arant
ATTORNEYS.

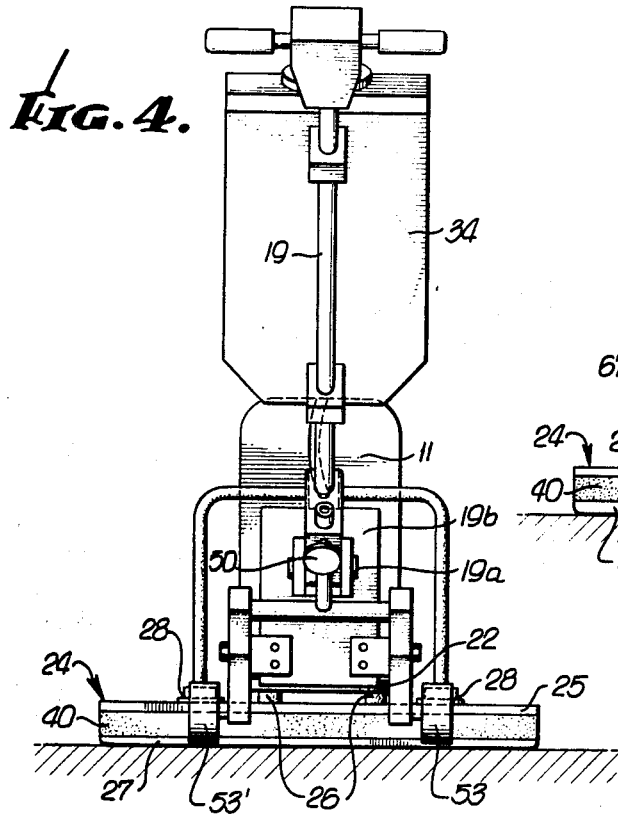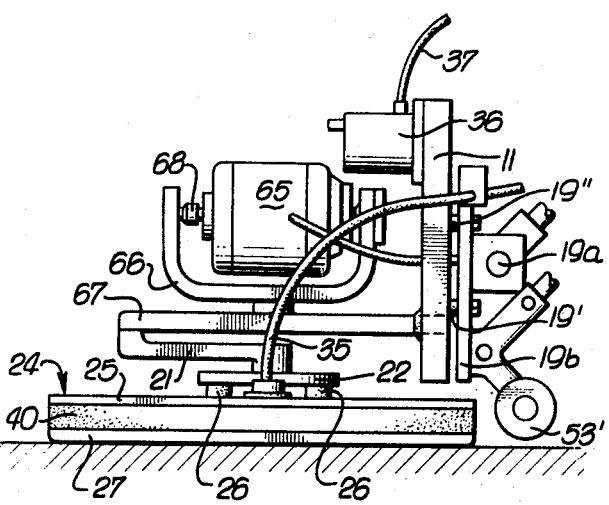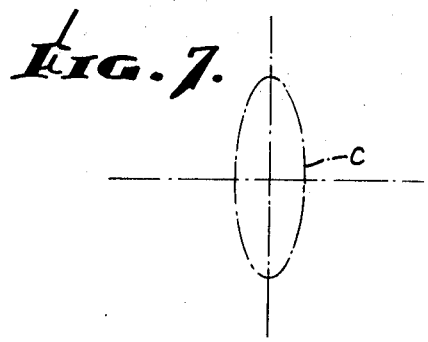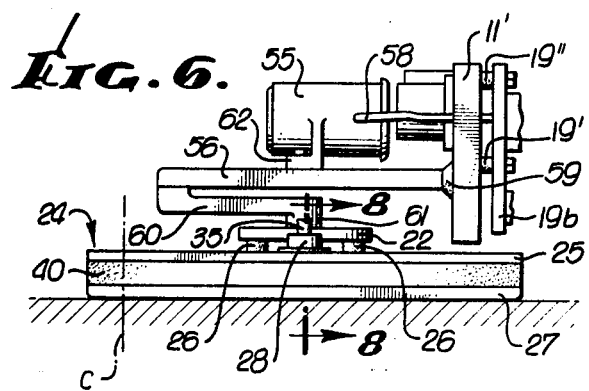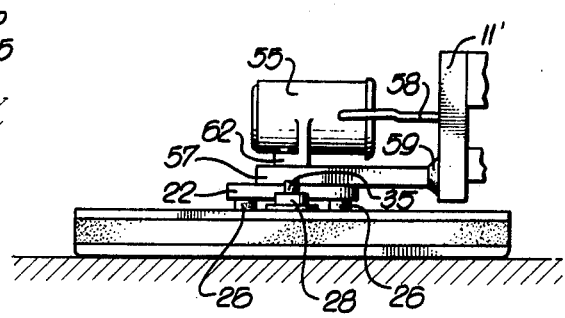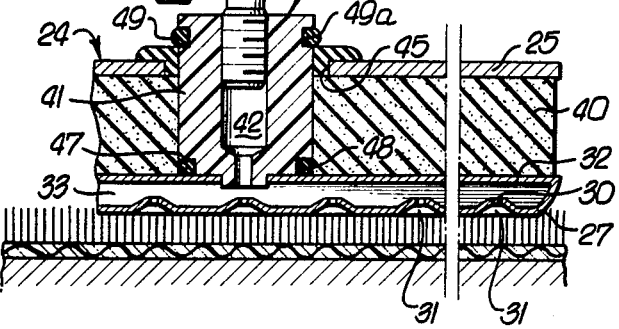
INVENTOR.
HAROLD T. SAWYER
By Beehler & Arant
ATTORNEYS.

Patented April 25, 1972

INVENTOR.
HAROLD T. SAWYER
BY Beehler & Arant
ATTORNEYS.

SURFACE CONDITIONER

This is a continuation-in-part of co-pending applications Ser. Nos. 631,736, filed Apr. 18, 1967 and now U.S. Pat. No. 3,507,695; 832,180, filed June 11, 1969; and 832,156, filed June 11, 1969.

RESUME OF PRIOR ART

Surface conditioning or finishing machines currently used in the industry rely on a single swing or motion in one plane only, be it a rotary machine or an oscillating machine. In addition, the frequency of the rotary motion and the oscillating motion is governed by the power necessary to overcome the coefficient of friction between the contacting faces of the machine and the surface to be conditioned. This power demand can be considerable, depending on the original condition of the surface and the efficiency of the devices is effected due to the lower speeds that must be used to keep the power demand within the power available and not open circuit breakers or blow fuses, or make the machines too large to be hand-operated. Present day machines used for conditioning surfaces are heavy so that the torques, forces and motions can be reacted to do the work required. Also, some of the machines react the torques, forces and motions through the operator causing excessive fatigue. Because of their relative large size and weight, extreme caution must be exercised during operation and change of location on the surface to achieve a uniform texture, as any unbalance will mar and cause flaws in the surface.

It is among the objects of this invention to provide new and improved portable surface conditioning applicance which makes use of the energy of resonant spring-mass vibration forces to condition, abrade, polish or finish the surface.

Still another object of the invention is to provide a new and improved portable, hand-operated surface conditioning appliance which is substantially low-powered, light in weight and highly efficient in the employment of resonant vibration forces and energy in all directions and planes of motions on the surface to be conditioned, while isolating the transfer of these resonant energy forces from the operator.

Still another object of the invention is to provide a new and improved surface conditioning appliance which is substantially portable and easy to operate by hand, the appliance being such that it consumes relatively little energy, can be moved about over the surface to be conditioned with particular ease, which is of such construction that it can be operated close to vertical walls or obstructions when used in enclosed areas, which is capable of reaching into corners and which, at the same time, is of such construction that there will be no marring of the surface during the conditioning operation.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIG. 1 is a plan view of one form of the device.

FIG. 2 is a side elevational view of the device on the line 2—2 of FIG. 1, with the housing shown in section.

FIG. 3a and 3b show ellipsoid resonant force patterns of the resonant plate and work shoe.

FIG. 4 is an end elevational view on the line 4—4 of FIG. 2.

FIG. 5 is a fragmentary side elevational view of a second form of the device.

FIG. 6 is a fragmentary side elevational view of another form of the device.

FIG. 7 shows an ellipsoid resonant force pattern of the resonant plate and work shoe of the device in FIG. 6.

FIG. 8 is a fragmentary sectional view on the line 8—8 of FIG. 6.

FIG. 9 is a fragmentary side elevational view of a simplified version of the device of FIG. 6.

Figure 10:
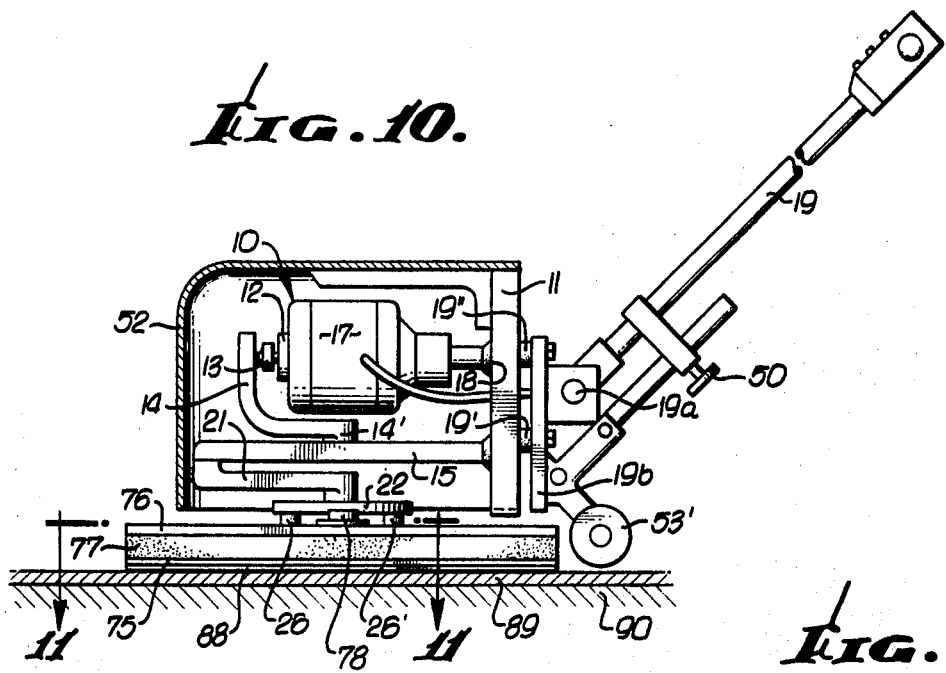
FIG. 10 is a side elevational view of a form of the device set up as a sander.
Figure 11:
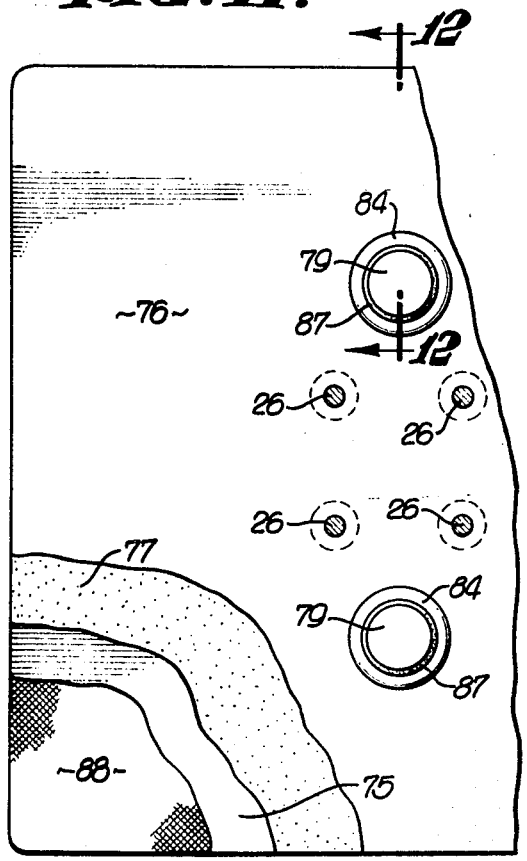
FIG. 11 is a horizontal sectional view on the line 11—11 of FIG. 10.

The invention is directed to devices especially adapted to the conditioning, polishing and finishing of materials such as concrete, wood, metal, plastic, fabric and the like, by the employment of the energy released through resonant excitation of a structure at any of its natural frequencies or modes of vibration. The resonant surface conditioning effect makes use of a relatively minimum energy source, and amplifying that minimum energy source with a structure comprising materials of known masses, inertias, modulus and stiffness to efficiently do work on the surface intended. In the several embodiments illustrated, there is a vertical base holding plate of relatively large mass to which the energy source and resonant structure is attached.

The source of energy, as shown in FIGS. 1 through 4 inclusive, takes the form of a synchronous induction electric motor 10 which is suspended at one end from a base holding plate 11. One end of the motor shaft 12 is supported by an eccentric mount 13 which revolves within a bearing 13' connection installed in a supporting pedestal 14 which is attached at the substantially central mount 14' only to a beam 15 intermediate its ends. The beam 15 here takes the form of a cantilever resiliently mounted at one end to the base holding plate 11. The other end 16 of a motor casing 17 is attached to a resilient bearing mounting 18 installed within the base holding plate 11.

The motor 10 mounted as described together with the eccentric mount 13 may aptly be referred to as an actuator assembly.

A manipulating handle 19 pivoted at 19a on its plate 19b is attached to the base holding plate 11 by resilient connections 19', 19'', the handle also being used to carry auxiliary appurtenances such as, for example, a tank 34 for cleaning liquid which may be essential when the device is set up as a carpet or fabric cleaner. The cantilever beam 15 has a captive end attached to the base holding plate 11 by means of a resilient bearing mount 20. At its other end the beam 15 is attached to an extension 21 which is supported in this instance on a circular plate 22. The circular plate in turn is resiliently mounted on a relatively larger plate beam 25, which holds the work shoe indicated generally by the reference character 24, the foregoing parts serving as surface contacting tool assembly.

The cantilever beam 15 is so designed that its fundamental natural frequency or mode of vibration is in phase with the rotational revolutions or direction of force motions of the vibrating frequency of the induction electric motor 10 or vibrating frequency of the energy source. The rotational motion of the eccentrically mounted rotor assembly excites the cantilever beam thus at its fundamental mode of vibration. The cantilevered beam thus motion-excited at the fundamental natural frequency amplifies the original vibration motion or amplitude in form of a bending wave along its principal axis. The vibration energy wave which is released is transferred through the extension 21 of relatively infinite stiffness to the circular plate 22. The circular plate is so designed that one of its fundamental modes of vibration or natural frequencies is also in phase with the bending mode of vibration of the cantilever beam. The resulting vibration motion of the circular-plate amplifies the wave energy transferred to it by the cantilever beam.

In this instance the excited circular plate 22 is resiliently attached to relatively large plate beam 25 which is part of the work shoe assembly 24. Resilient mounts 26 are interconnected to the circular plate and plate beam so that the resulting amplification of the bending wave motions and forces and energy of vibration motion is transferred to the plate beam 25 and thence to work contact plate or shoe 27 of the work shoe assembly 24. Depending on the availability of the power, amplitude and force of energy source, the large plate beam, here shown as a square plate, can be attached directly to or resiliently mounted to the energy source.

The work shoe assembly 24 is shown attached to the resonant assembly in this particular design through plug-in retainer posts 28, details of which are shown in FIG. 8. The plug-in retainer posts are of relatively stiff material and so designed that a transfer of motion energy is accomplished parallel to the work surface. The work shoe assembly, in the embodiment of FIGS. 1 through 4 and FIG. 8, makes use of the work contact plate 27 having holes 30 extending in a pattern throughout its length and breadth, these holes being located at the tops of appropriate recesses 31. A back-up plate 32 parallel to and spaced from the work contact plate 27 provides a reservoir 33 for appropriate conditioning fluid or cleaning liquid supplied from a tank 34 through hoses 35 connected to the retainer posts. If need be a compressor 36 may be employed to keep air pressure in the tank 34 through a pressure line 37.

A resilient pad 40 of material such as urethane which is sponge material is bonded to the upper face of the back-up plate 32 and the pad is sandwiched between the back-up plate and the relatively large plate beam 25, but has only a face-to-face pressure contact with the plate beam.

In instances where a conditioning fluid is necessary and for holding the pad under a slight pressure, use is made of the retainer posts 28. These each comprise a plug 41 of stiff material bonded to the back-up plate, the plug having a bore 42 therethrough in communication at one end with the reservoir 33 and at the the other end with the hose 35 through a conventional fitting 43. In this back-up plate 25 is an opening 45 accommodating a resilient grommet 46 to isolate the plug from the back-up plate. An O-ring 47 in a recess 48 forms a seal at the bottom. A similar O-ring 49 in a recess 50 acts like a snap ring to hold the plug in the position shown in FIG. 8, in which position the pad 40 is under pressure.

The relatively large plate beam 25 is free to vibrate in all directions in phase with the energy source. The plug-in retainer posts, functioning as described, serve to release and engage various work shoe assemblies which serve as various different types of surface conditioners.

For manipulating the machine about when not in a conditioning operation, use is made of a pair of wheels 53 which can be held, raised or lowered by an attachment 50.

Although the work shoe assembly 24 has been described in some detail for use with the device of FIGS. 1-4, it is, however, interchangeable with any of the other forms of the device.

In the operation of this form of the device, the motor 10 is set into operation and as the motor shaft 12 rotates the eccentric mount 13 is simultaneously caused to rotate. This operation generates a conical circulatory movement of the motor shaft about its longitudinal axis with the base of the cone being at the eccentrically mounted end and the apex of the cone being at the resilient bearing mount 18. The motor thus rotates about an axis substantially coincident with that of the eccentric mount 13 on the pedestal and the axis of the opposite end 16 of the motor. The sinusoidal vibratory energy forces thus generated by the rotating mass of the motor 10 are passed through the pedestal 14 to the resonant cantilever beam 15 and, in that way, to the circular plate 22 and thence through the resilient mounts 26 to the relatively large resonant plate 25 and finally to the work shoe assembly 24 where the amplified vibratory energy forces are utilized to do the work intended.

It is significant that the center of mass of the sinusoidal vibratory energy source 10, namely, the motors is at or near the antinode, or point of maximum bending wave amplitude of the resonant cantilever beam 15, which is the point of attachment of the pedestal 14 which in-line orientation continues to the point of attachment of the pedestal 14 to the resonant circular plate 22 and that combined attachment through the geometric center of the resilient mounts 26 to the center of the resonant plate beam 25 and the work shoe assembly 24. For aesthetic purposes a cover 52 may be attached to the base holding plate by appropriate conventional means.

In the device of the embodiment of FIGS. 6 and 9 the sinusoidal vibratory energy source is a commercially available device 55 which is attached to a resonant cantilever beam 56 and the sinusoidal vibratory energy thus developed is transferred through the structure as heretofore described to the work shoe assembly 24 to complete the purpose of the device.

In this form of the device the cantilever beam 56 in the case of FIG. 6 and the cantilever beam 57 in the case of FIG. 9 are the only means of attachment of the energy source to the base holding plate 11 through a resilient bearing mount 59. Electric cables 58 supply power to the vibrator 55.

In FIG. 6 the cantilever beam has an extension 60 which is directed back upon itself in parallel relationship to a connection 61 in substantial vertical alignment with an attachment 62 for the vibrator 55 on this cantilever beam 56 intermediate its ends. A plate 22, usually circular, is attached to the connection and in turn is mounted on the plate beam 25 by means of the resilient mounts 26.

In the structure of FIG. 9 the cantilever beam 57 is connected directly to a plate 22 which in turn is connected to the plate beam 25 by means of the resilient mounts 26.

In the device of FIG. 5 the synchronous sinusoidal vibration energy source takes the form of a motor 65 which is attached directly by means of a U-shaped pedestal 66 to a resonant cantilever beam 67. The motor 65 is attached to the pedestal 66 by use of an eccentric device 68 on the motor shaft (not shown) which revolves within a bearing in a leg 70 and a resilient bearing 69 at the other end which connects the casing of the motor 65 to the other leg 70 of the pedestal 66. The cantilever beam 67 is connected to the plate beam 25 in the same manner as has been described in connection with FIGS. 2 and 6.

The sinusoidal vibratory energy forces thus developed are transferred through the structure as heretofore described to the work shoe 27 to complete the purpose of the device.

As in the case of the motor 10, the vibrator 55 or the motor 65, mounted as described, serves as an actuator assembly.

In all forms of the device to keep the energy developed by the vibratory devices from exciting the manipulating handle 19, the resilient connections 19', 19" and appropriate base holding plate 11 are designed into the entire system.

The choice of sinusoidal vibration energy source is dependent on minimizing the demand for power available to that required to complete the purpose of the device.

Although the mechanism for creation of the sinusoidal vibration energy in the devices of FIGS. 10, 11, 12 and 13 is essentially the same as in the devices already described, the device is shown in FIG. 10 to demonstrate operability with work shoe assemblies of other types and for other uses.

Figure 12:
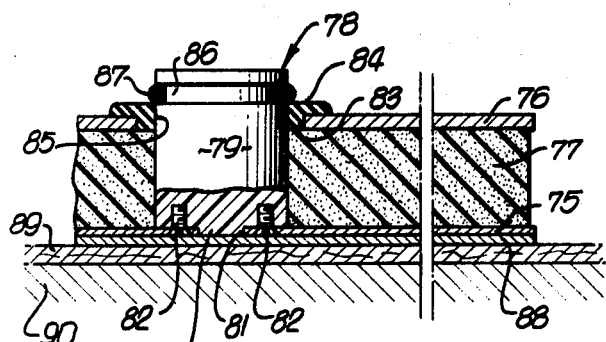
FIG. 12 is a fragmentary sectional view on the line 12—12 of FIG. 11.

The work shoe assembly of FIG. 12, for example, serves as a sander and makes use of a work shoe plate 75, co-extensive with a back-up plate 76 which are assembled with a pad 77. The pad 77 is bonded to the work shoe plate 75 but is merely in face-to-face contact with the back-up plate 76, so that it can be removed and replaced as occasion requires.

In this example a retainer post 78 comprises a solid plug 79 of stiff material having an extension 80 received in a hole 81 in the work shoe plate 75, the plug being anchored in place by screws 82 or other conventional means. In a hole 83 in the back-up plate is a resilient grommet 84 within which is an opening 85 to accommodate the plug 79. An annular recess 86 in the plug receives a flexible O-ring 87 serving as a retaining snap ring. The location of the annular recess 86 is such that the pad 77 must be compressed to expose the recess and the pad is therefore compressed to a degree to make a complete thorough contact with both the back-up plate and the work shoe plate.

To remove the work shoe assembly, the work shoe plate is pressed against the pad 77 until the plug 79 protrudes far enough to permit removal of the O-ring from each of the plugs, after which the plugs are slipped clear of the back-up plate.

When the device is to be used for a sanding or abrasive operation, a sheet 88 of abrasive material is fastened to the lower face of the work shoe plate by some convenient means such as pressure sensitive adhesive or, in any event, a type of bond which will permit removal of the sheet after it becomes worn out. FIGS. 10 and 12 illustrate a sanding operation upon a surface layer 89 of a sub-floor 90.

Figure 13:
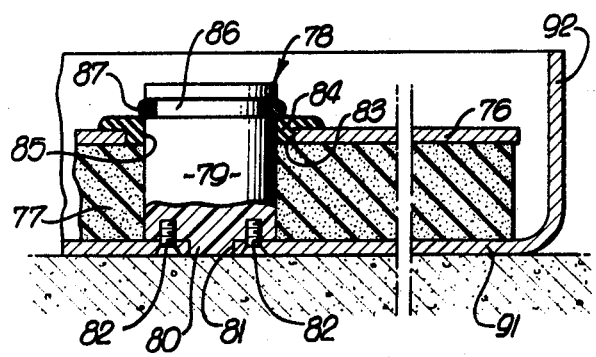
FIG. 13 is a fragmentary sectional view similar to FIG. 12 but with the device set up as a concrete finisher.

Other types of work shoe assemblies also may be employed, as for example a concrete finishing work shoe 90 as shown in FIG. 13. The concrete finishing work shoe may be attached to the plug 79 by the same means described in connection with FIG. 12. The work shoe for concrete finishing has a flange 92 extending around the entire perimeter of the work shoe assembly to prevent wet concrete from accumulating in the space around the pad 77 and impairing its operation.

From the foregoing description of a small variety of different types of work shoes, it will be clear that still other types of work shoes devoted to other uses may be employed in a similar fashion.

In operation as a cleaning tool, for instance, the appliance is first set up as shown and described and the tank is filled with cleaning fluid. When the appliance is placed in contact with the surface to be cleaned, the sinusoidal vibratory energy device is started and a suitable fluid valve opened to flow condition. Such valves need not be regulating valves, since they can be arranged in a position to supply fluid under circumstances wherein the call for fluid will be a constant one, depending upon the structure of the appliance. The required or desired wetness on the medium to be cleaned may be controlled by pressure in the tank. The liquid thus released flows through the hose 35 into the work shoe assembly 24 by means of the bore in retainer posts 28. The vibratory resonant energy forces developed by the appliance transmitted to the work shoe 27 results in cavitation within the fluid now in the reservoir 33. Fluid emerges in the form of a foam and is applied, as foam, to the surface to be cleaned, such as, for example, a carpet, rug or fabric. As the operation and the resonant vibration and excitation of the appliance structure continues, agitation of the foaming fluid will continue as it surrounds the fibers of the fabric and passes through and around the weave or pile of the fabric, if it be rug or carpet, to the anchoring base of the fibers. This will be sufficient likewise to excite the individual fibers at a resonant condition in the form of individual cantilever beams, accounting more and more for the efficient cleaning action of the appliance. Since there is substantially constant emission of liquid through the work shoe 27 and constant agitation within the liquid, the appliance will rest but very lightly on the surface on which the work is being performed, and the appliance can then be moved steadily and freely and with little physical exertion over all portions of the surface, near the base board and into the corners. The work progresses as described until all portions of the work have thus been treated with the cleaning action developed within the liquid by the vibration energy of the resonant fabric cleaning device.

The fluid valve is then closed and the resonant cleaning device is then guided over the surface to continue the action within the fluid medium surrounding the fabric fibers and exciting the fibers themselves to complete the cleaning operation and ultimately bring the fluid to the surface.

In a finishing process wherein the surface is relatively hard, the motion excitation in a direction parallel to the work surface and the vibration energy forces parallel and perpendicular to the work surface will polish or abrade the surface, depending on the type of polishing or finishing required of the work shoe. For instance, when finishing newly poured concrete the work shoe face will be designed similar to conventional hand tamps so that the bending waves induced in the resonant plate beam will cause compression waves to excite the work shoe, causing the contact plate to impinge on the surface of the concrete and bring the fines of the aggregate within the concrete mixture to the surface while forcing the coarse aggregate away from the surface. In the final finishing process the work shoe face or contact plate will have a relatively smooth surface, depending on the finish desired on the concrete, and the energy motion imparted to the work shoe parallel to the surface to be finished will act on the surface similar to the motion of a hand trowel, and accordingly provide the appropriate texture to the surface to be finished.

Similarly, when polishing or finishing a wood surface such as a floor, the work shoe or contact plate can be faced with an abrasive material such as sandpaper, emery cloth or light buffing cloth, and accordingly provide the abrasive action or polishing for the appropriate texture specified.

It should be understood that release of stored mechanical energy available within a structure is at a maximum when the structure of the mechanical system is vibrated in the region of the fundamental resonant frequency. One of the objectives of this invention is to provide a conditioning device which requires a minimum source of power and vibratory energy source and to use resonant vibration forces developed by the fundamental vibration frequency of the energy source to cause the onset of cavitation within the fluid when it is used in the operation. It is also known that cavitation within a fluid medium can be utilized to clean, dye or prepare surfaces of various materials.

By having the vibratory sinusoidal energy forces generated by the synchronous energy source operating at a discreet vibration frequency and applied at the antinode or point of maximum amplitude or excursion of a bending wave in a cantilever beam 15 or plate beam 25 designed to have its fundamental vibration resonant frequency in phase with the discreet vibration frequency generated by the energy source then a condition of maximum output for minimum input is obtained. Moreover, a bending wave in a structure causes compression waves in the surrounding medium and which when impressed on a medium such as a fluid cause alternating positive and negative pressures within the fluid due to the excursions of the structure. Somewhat oversimplified cavitation can be described physically as the rupture of the cleaning fluid which is under the large resonant plate beam 25 of FIG. 2 which also is being vibrated at the discreet vibration frequency and within the work shoe 24 and on or surrounding the fibers or surfaces of that which is to be cleaned. This fluid rupture or cavitation is caused by the high vacuum developed during the negative excursion cycles of the compression waves exceeding the combined static pressure and tensile strength or cohesives forces of the cleaning fluid. Pressure action as described causes cavities or bubbles in the cleaning fluid which when forced out of the work shoe surround the fabric as a foam, The collapse or implosion of those cavities is cavitation at work, in that the vacuum created by the collapse pulls the dirt from the fibers and into the foam. This dirt-filled foam is moved by commercial vacuum devices or by other conventional methods.

The surface conditioning device depends on its efficiency being maximum at a minimum of exciting or operating power while developing a maximum of conditioning power while being designed to operate at a vibratory resonant condition with the fundamental natural frequency of the structure being resonant to the forcing frequency in phase where required and being isolated to protect the operator as obviously required.

While the invention has herein been shown and described in what is conceived to be a practical and effective embodiment, it is recognized that departures may be made therefrom within the scope of the invention, which is not to be limited to the details disclosed herein.

I claim:

1. A surface conditioner comprising a frame and a handle on the frame for manipulating the conditioner over a selected surface, a rotating actuator assembly including means eccentric to an axis of rotational motion adapted to generate a sinusoidal form of vibrating energy, a cantilever beam having a resilient mounting at one end on said frame, a surface contacting tool assembly comprising a work show for engagement with the surface, a back-up plate of shape and transverse dimension substantially corresponding to said work shoe, and sponge material secured between said work shoe and said back-up plate, said work shoe, said sponge material and said back-up plate being adapted to vibrate in a condition at or near their respective natural frequencies, a substantially central mount connected to said back-up plate and a relatively stiff connection between said mount and said actuator assembly, whereby said work shoe is vibrated in a sinusoidal pattern in response to said actuator, said actuator assembly and said back-up plate having an inter-connecting means through said cantilever beam.

2. A surface conditioner according to claim 1 wherein there is a resonant plate mounted intermediate said back-up plate and said actuator assembly, said resonant plate extending radially outwardly relative to said central mount, and a plurality of resilient mounts between said resonant plate and said back-up plate located radially outwardly from said central mount.

3. A surface conditioner as in claim 2 wherein said resonant plate is circular in form.

4. A surface conditioner as in claim 1 wherein said interconnecting means includes a reversely bent arm; said actuator assembly being connected to said cantilever beam intermediate opposite ends thereof, said reversely bent arm having a relatively fixed end connected to said cantilever beam and a relatively free end connected to said resonant plate.

5. A surface conditioner as in claim 4 wherein said actuator assembly comprises an electric motor with the axis of rotation of a motor shaft therefor substantially parallel to said work shoe and a weight rotationally driven by said motor shaft, said weight being eccentric with respect to its axis of rotation.

6. A surface conditioner as in claim 4 wherein said actuator assembly comprises an electric motor having a housing, a rotor, a motor shaft mounting said rotor in the housing, a mounting bracket having an intermediate portion attached to said cantilever intermediate opposite ends thereof, said bracket having two legs, an eccentric connection between said motor shaft and one of said legs and a resilient connection between said motor housing and the other legs substantially in axial alignment with said motor shaft.

7. A surface conditioner as in claim 4 wherein said actuator assembly comprises an electric motor having a housing, a rotor, a motor shaft mounting said rotor in said housing, an eccentric connection at one end of said motor shaft, a bracket interconnecting said eccentric connection and said arm intermediate opposite ends of said cantilever beam, and a resilient connection between said motor housing and said frame at a location substantially in axial alignment with said motor shaft.

8. A surface conditioner as in claim 1 wherein said work shoe comprises a surface engaging plate and a rear plate in spaced parallel position forming a chamber therebetween, a multiplicity of ports through said surface engaging plate in communication between said chamber and the exterior, and means for supplying conditioning fluid to said chamber.

9. A surface conditioner as in claim 1 wherein said work shoe comprises a surface contacting plate, plug means on said surface contacting plate extending through said pad and said back-up plate, and a removable connection between said plug means and said back-up plate.

10. A surface conditioner as in claim 9 wherein said surface contacting plate has a perimetral flange having a heighth sufficient to be located above said back-up plate.

11. A surface conditioner as in claim 2 wherein said resilient mounts between the resonant plate and the back-up plate are resilient only in a transverse direction and relatively stiff in a direction in alignment with respectively said resonant plate and said back-up plate.

12. A surface conditioner as in claim 2 wherein there is a protective housing surrounding said actuator assembly and attached to said frame, said housing being free of engagement with said actuator assembly.

13. A surface conditioner as in claim 2 wherein said interconnecting means comprises a rigid direct connection from said actuator assembly through an end of said cantilever beam remote from the resilient mounting to said resonant plate.

* * * * *